United States Patent

Jeong et al.

[11] Patent Number: 5,886,486
[45] Date of Patent: Mar. 23, 1999

[54] SENSORLESS BRUSHLESS DC MOTOR

[75] Inventors: Seong-ki Jeong, Suwon; In-joong Ha, Seoul; Doo-hee Jung, Kyonggi-do, all of Rep. of Korea

[73] Assignee: Samsung Electronics Co., Ltd., Rep. of Korea

[21] Appl. No.: 19,298

[22] Filed: Feb. 5, 1998

[30] Foreign Application Priority Data

Feb. 6, 1997 [KR] Rep. of Korea ............... 1997 3676

[51] Int. Cl.$^6$ .................................................. H02P 7/00
[52] U.S. Cl. ........................................ 318/254; 318/439
[58] Field of Search .............................. 318/254, 439, 318/138

[56] References Cited

U.S. PATENT DOCUMENTS

| | | | |
|---|---|---|---|
| 3,906,320 | 9/1975 | Doemen | 318/254 |
| 4,752,724 | 6/1988 | Radziwill et al. | 318/254 |
| 5,202,614 | 4/1993 | Peters et al. | 318/254 |
| 5,397,971 | 3/1995 | McAllister et al. | 318/254 |
| 5,506,487 | 4/1996 | Young et al. | 318/811 |

FOREIGN PATENT DOCUMENTS

| | | |
|---|---|---|
| 4-317585 | 11/1992 | Japan . |
| 5-260786 | 10/1993 | Japan . |
| 6-303796 | 10/1994 | Japan . |
| 7-255194 | 10/1995 | Japan . |

Primary Examiner—Jonathan Wysocki
Attorney, Agent, or Firm—Larson & Taylor

[57] ABSTRACT

A control circuit and method for controlling a sensorless brushless DC motor are provided which are capable of effectively filtering noise. The control circuit includes: a phase voltage measuring unit for determining the voltage of each phase from the terminal voltages of the stator coils; a phase voltage sign detecting unit for detecting the sign of the phase voltage measured from the phase voltage measuring unit and outputting a phase voltage sign signal; and a digital phase-shifter for generating a delay signal which is delayed up to 90° with respect to the phase voltage sign signal and supplying the delayed signal to the commutation unit.

6 Claims, 7 Drawing Sheets

SENSORLESS BRUSHLESS DC MOTOR

BACKGROUND OF THE INVENTION

1. Field of the Invention

The present invention relates to a sensorless brushless DC motor (hereinafter referred to as sensorless BLDC motor) used where the temperature or humidity is high or a position sensor is difficult to establish, and more particularly, to an apparatus and method for controlling a sensorless BLDC motor which effectively filters out the influence of noise.

2. Related Art

The electronic industry has been investigating brushless DC motors because of the small size of such motors. In a brushless motor, it is essential to exactly measure the position of a motor rotor to exactly supply the voltage and a position measuring apparatus can be used for this purpose. However, when a sensor of the rotor position measuring apparatus does not operate properly due to high humidity or temperature, or, in an apparatus, such as a compressor, in which it is impossible to employ such a position measuring apparatus, it becomes difficult to exactly measure the rotor position. Moreover, because the space occupied by the rotor position measuring apparatus in the BLDC motor is so large, a sensorless BLDC motor is desirable.

Such a sensorless BLDC motor controls the power supplied to a stator coil based upon an induced voltage at the stator coil terminal. In a sensorless BLDC motor, the rotor has no position sensor.

An edge detection signal is generated by detecting the edge of the waveform of a comparative output which is obtained by comparing an induced voltage generated at each terminal of a plurality of stator coils located along with the rotational direction of the stator with a standard electric potential (0 V).

Presently, in order to remove a variation in the output caused by a spike voltage Vs produced when the power supply is turned on or off, the compared output is standardized. This standardized compared output is used to control power supplied to each stator coil, i.e., commutation is performed based on this output.

However, in instances where the edge signal is generated at a point at which the power of the stator coils is not turned on or off, the system will not operate properly. In other words, when commutation time of the stator coil is inaccurate, the motor is not rotated smoothly.

In order to solve the problem discussed above, improved motors have been developed. The motor disclosed in Japanese Patent Laid-open No. 4-317585 (1992), which is one of the improved motors, will now be considered.

FIG. 1 is a block diagram illustrating a control circuit of a conventional sensorless BLDC motor while FIG. 2 is a waveform illustrating the operating states of the units of FIG. 1. Referring to FIGS. 1 and 2, stator coils Lu, Lv, and Lw are arranged according to the rotational direction of the rotor, and are connected to a commutation signal generating circuit 1. The control circuit of FIG. 1 also includes a multiple phase driving circuit 2, a zero level comparison circuit 3, and an edge detection circuit 4. In addition, the control circuit includes a timing control circuit 5, an edge detection control circuit 6, and a starting oscillation circuit 8 as well as a clock converting or switching circuit 8 and a control unit 9.

The commutation signal generating circuit 1 generates the multiple phase control signal for controlling the power supply to each stator coil Lu, Lv and Lw, i.e., the commutation signals, according to a signal clock CK. The multiple phase driving circuit 2 supplies the power to drive stator coils Lu, Lv and Lw according to the phase based upon the commutation signals. The zero level comparison circuit 3 compares the induced voltages U-N, V-N and W-N generated at each terminal of the stator coils Lu, Lv and Lw with a standard electrical potential 0 V. A hysteresis comparison circuit having a predetermined input value is preferably used as the zero level comparison circuit 3. The edge detection circuit 4 detects the edge of the output wave forms of the comparison circuit 3 according to their phase, and logically adds an edge detection pulse of each phase, thereby generating a standard clock signal CK2 of the commutation signal generating circuit 1. The timing control circuit 5 delays the standard clock signal CK2 generated by the edge detection circuit 4 as much as a predetermined time t2, and transmits a delayed standard clock signal CK used in generating the commutation signals of the commutation signal generating circuit 1.

The edge detection control circuit 6, which includes a delay circuit 61 and an OR logic gate 62, prevents the edge detection of the waveforms of the compared outputs of each corresponding phase when the power supplied to the stator coils Lu, Lv and Lw is turned on or off, based upon a status signal indicating the operating state of the commutation signal generating circuit 1. The oscillation circuit 7 generates a standard clock signal CK1 when the motor starts. At this time, the switching or converting circuit 8 receives the standard clock signal CK1 from the oscillation circuit 7, and transmits the standard clock signal CK to the commutation signal generating circuit 1 through the timing control circuit 5. After the motor is energized, i.e., driven, the switching circuit 8 receives the standard clock signal CK2 from the edge detection circuit 4, and transmits the standard clock signal CK to the commutation signal generating circuit 1 through the timing control circuit 5. The control unit 9 controls the switching circuit 8 according to the standard clock CK2 outputted from the edge detection circuit 4.

Considering the operation of the control circuit of FIG. 1, the driving circuit of the sensorless BLDC motor derives the standard clock signal CK used for controlling commutation by comparing the induced voltages U-N, V-N and W-N generated at each terminal of the stator coils Lu, Lv, and Lw with each standard electrical potential 0 V, and by detecting each edge of the waveforms of the compared outputs according to their phases. At this time, the influence of the spike voltage Vs generated by switching of the power supply of each stator coil Lu, Lv, and Lw is detected by the comparison circuit 3. Before being detected by the edge detection circuit 4, the spike is selectively precluded from detection by the edge detection control circuit 6. However, depending upon the control state, when the phase voltage is measured in a transition state or when there is a heavy motor load, noise that interferes with edge detection can be produced even at points where the power supplied to the stator coils is not turned on or off. Moreover, the prior art motors allow the induced voltages to exceed the zero voltage level while the edge detection is prohibited and disturbs the precision of the commutation signals.

SUMMARY OF THE INVENTION

In accordance with the invention, a control circuit and method are provided for controlling the magnetization of a plurality of stator coils by a power supply signal supplied from a commutation unit to a sensorless brushless direct current (BLDC) motor.

According to one aspect of the invention, the control circuit includes: a phase voltage determining means for determining the voltage of each phase from the terminal voltages of the stator coils; a phase voltage sign detecting means for detecting the sign of the phase voltage measured from the phase voltage determining means and outputting a phase voltage sign signal; and a digital phase-shifter for generating a delay signal which is delayed up to 90° with respect to the phase voltage sign signal and supplying the delayed signal to the commutation unit.

In a preferred embodiment, the digital phase-shifter of the control circuit includes: a first counter for counting to a higher value when the phase voltage sign signal has a high state; a second counter for counting to a higher value when the phase voltage sign signal has a low state; a comparing means for determining whether the value of one of the counters is at least equal to ½ the value of the other of the counters and less than the value of the other of the counters; a clear means for resetting the other of the counters to a value of zero when the value of the one of the counters is at least equal to ½ the value of the other of the counters and less than the value of the other of the counters; and a delay signal generating means for generating a first signal when the first counter is reset to zero by the clear means, and generating a second signal of a different state from the first signal when the second counter is reset to zero by the clear means.

In an even more preferred embodiment, the digital phase-shifter of the control circuit further includes: a set value comparison means for comparing the value of each of the counters with a predetermined maximum value; and a set value maintaining means for maintaining the value of a compared counter at the maximum value when the value of the compared counter is not less than said maximum value.

In another aspect of the invention, the control includes: a stepping signal generating means for generating stepping signals for starting the motor; a phase voltage detecting means for detecting the voltages of each phase of stator coils of the motor; a phase voltage sign detecting means for detecting the polarity of each of the phase voltages detected by the phase voltage detecting means and outputting corresponding phase voltage sign signals; a digital phase-shifter for outputting phase shifted signals delayed up to 90° with respect to the phase voltage sign signals; a mode selection means for comparing the stepping signals with the phase shifted signals and outputting the stepping signals until the motor reaches a predetermined speed and outputting the phase shifted signals after the motor reaches the predetermined speed; a commutation unit for outputting the signal selected by the mode selection unit as a power supply signal of the stator coils; and an inverter for supplying the electric power to the stator coils of the motor according to the power supply signal of the commutation means.

In a preferred embodiment, the digital phase-shifter comprises three phase shifter units, each of the phase shifter units includes: a first counter for counting to a higher value when the phase voltage sign signal is a logic high signal; a second counter for counting to a higher value when the phase voltage sign signal is a logic low signal; a comparator for determining if the value of one counter is at least equal to the value of the other of the counters and less than the value of the other of the counters; and a delay signal generating means for changing a delay signal which changes when the value of one of the counters is at least equal to the value of the other of the counters and less than the value of the other of the counters.

In accordance with another aspect of the invention, a control method motor for controlling the magnetization of a plurality of stator coils by a power supply signal applied by a commutation unit is provided for a sensorless brushless DC motor. The method includes the steps of: determining each phase voltage from the terminal voltages of each phase of the stators; detecting the sign of the phase voltages measured by the step of determining the phase voltages; and a digital phase-shifting for generating signals delayed up to 90° with respect to the phase voltage signals from the step of detecting the sign of the phase voltage, and outputting the delayed signals to the commutation unit.

In a preferred embodiment, the step of digital phase-shifting includes the steps of: counting to a higher value with a first counter when the sign of the phase voltage detected by said step of detecting the sign of the phase voltage is positive; counting to a higher value with a second counter when the sign of the phase voltage detected by the step of detecting the sign of the phase voltage is positive; comparing the values in the first and second counters for determining whether the value of one of the counters is greater than at least ½ the value of the other of the counters and less than the value of the other of the counters; resetting the other of the counters to a value to zero when the one of the counters is at least equal to one-half the value of the other of the counters and less than the value of the other of the counters; generating a delay signal for generating a logic low signal when the first counter is reset in the resetting step and generating a logic high signal when the second counter is reset in the resetting step.

In an even more preferred embodiment, the step of digital phase-shifting further includes the steps of: comparing the value of each of the counters with a predetermined maximum value; and maintaining the value of any of the counters at the maximum value when the value of the respective counter is not less than the maximum value.

Other features and advantages of the invention will be set forth in, or apparent from, the following detailed description of preferred embodiments of the invention.

BRIEF DESCRIPTION OF THE DRAWINGS

The above object and advantages of the present invention will be more clearly understood from the following detailed description thereof, taken in conjunction with the accompanying drawings, in which.

DESCRIPTION OF THE PREFERRED EMBODIMENTS

Figure 1:
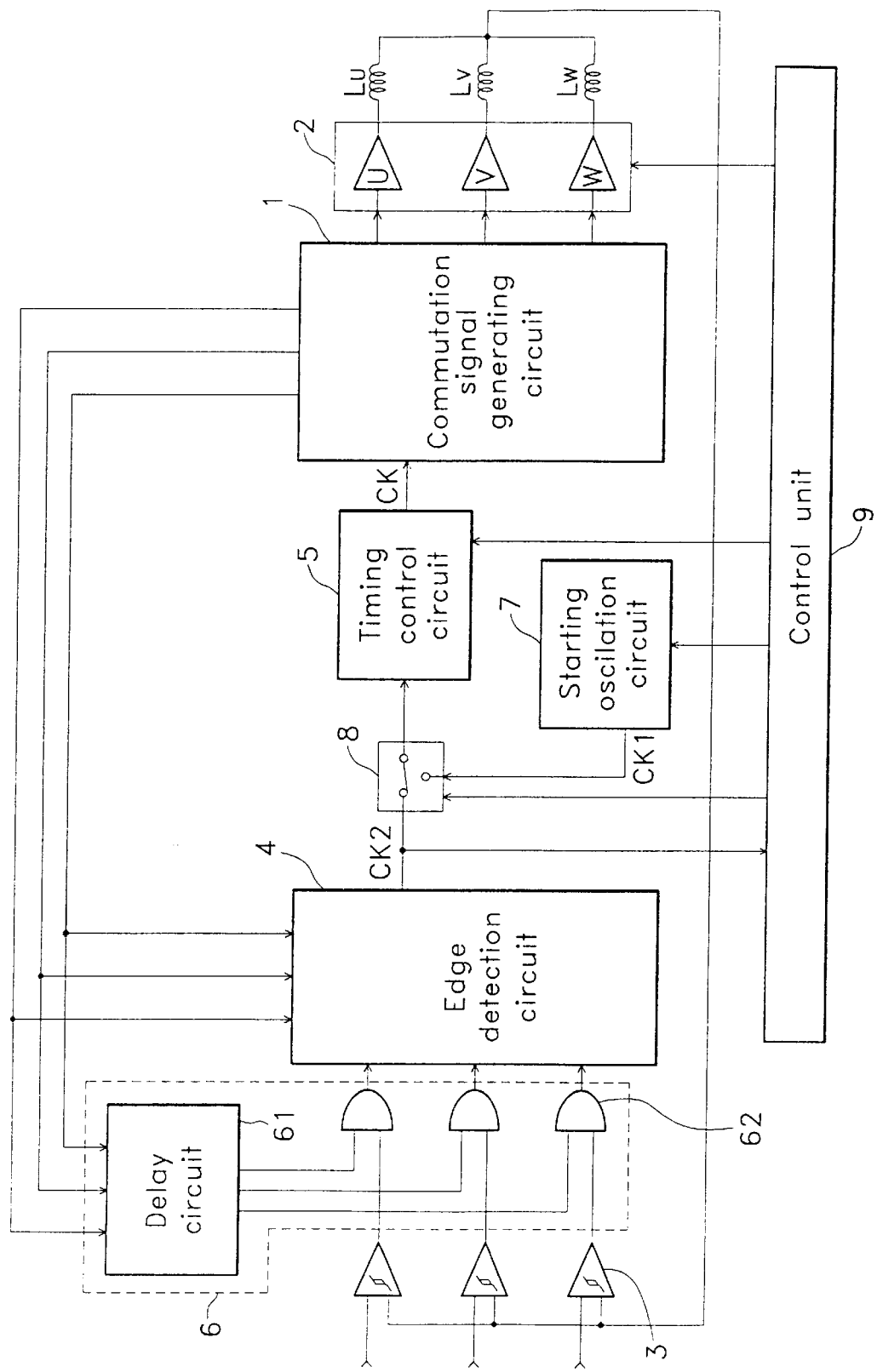
FIG. 1 is a block diagram illustrating a control circuit of a conventional sensorless BLDC motor, as described above.
Figure 2:
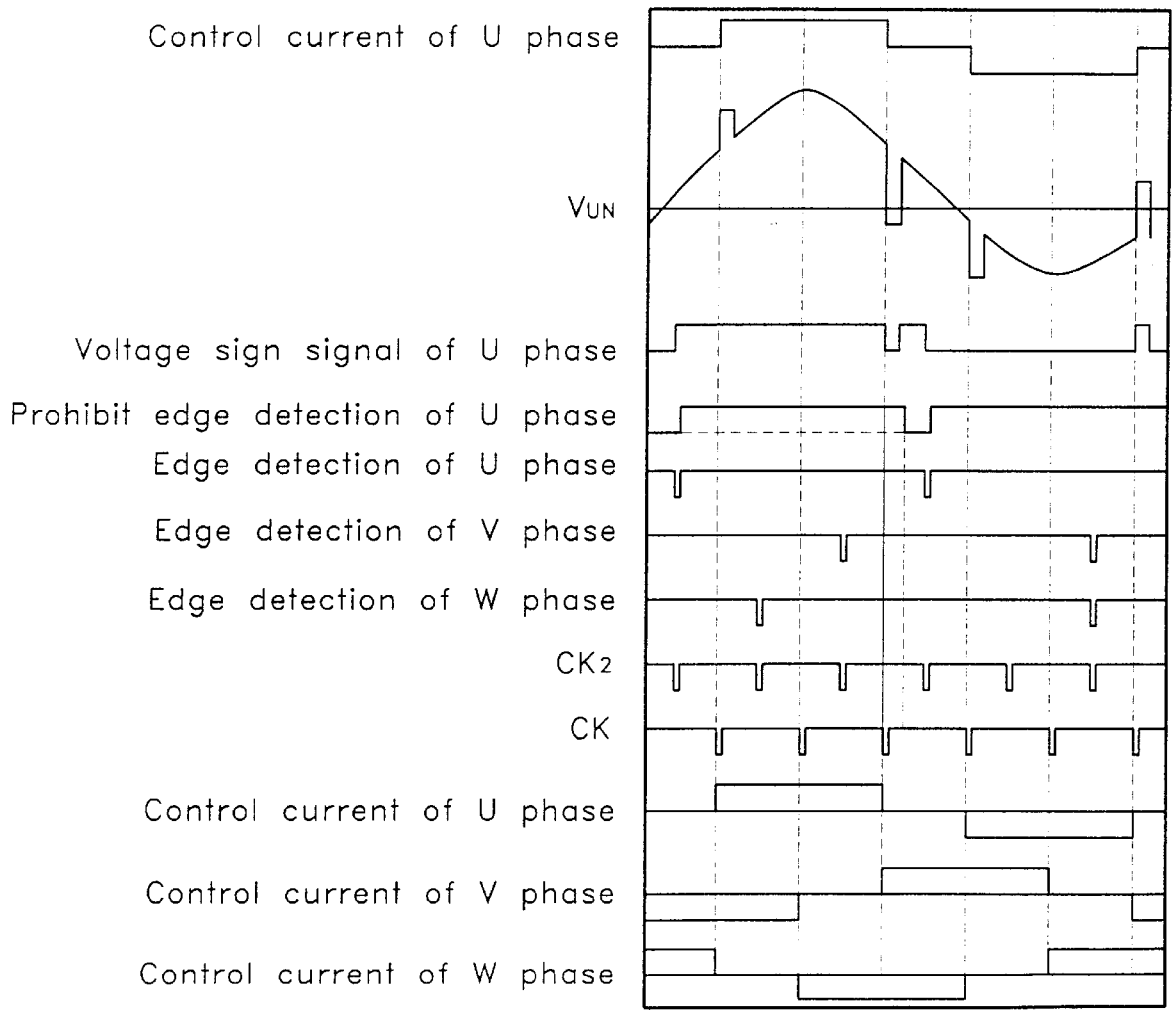
FIG. 2 is a waveform diagram illustrating the operating state of key units of the control circuit shown in FIG. 1.
Figure 3:
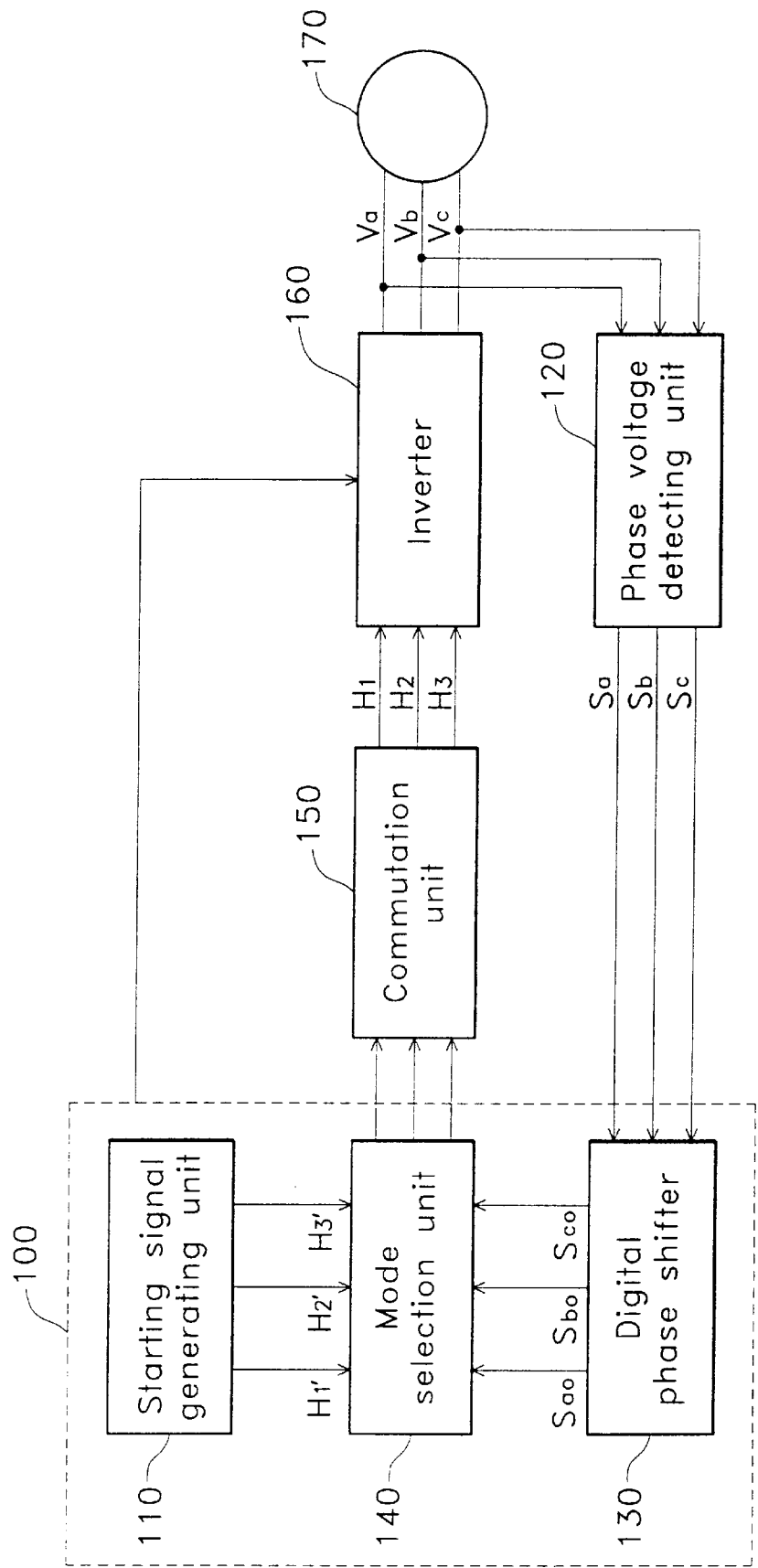
FIG. 3 is a block diagram of a control circuit in accordance with a first embodiment of the present invention.

Referring to FIG. 3, a starting signal generating unit 110, indicated as being part of a microcomputer 100, generates stepping signals H1', H2' and H3' until a motor 170 arrives at a prescribed speed after initial starting of the motor 170. A phase voltage detecting unit 120 calculates the phase voltage from each terminal voltage V$a$, V$b$ and V$c$ of the three phases of motor 170 and detects the signs of each phase voltage. A digital phase-shifter 130 generates a signal delayed up to 90° with respect to the input waveform of the phase voltage detected by the phase voltage detecting unit 120. A mode selection unit 140, connected to starting signal generating unit 110 and to digital phase shifter 130, determines whether the motor 170 arrived at a prescribed speed in the starting stage of the motor. A commutation unit 150 connected to the output of mode selection unit 140 provides a power supply signal in accordance with the signal received from the digital phase-shifter 130 or the signal from the starting signal generating unit 110 depending on the state of mode selection unit 140. An inverter 160 accelerates the motor 170 according to the speed information obtained from the digital phase-shifter 130 and a voltage command of pulse width modulation (PWM) form (not shown). The sensorless BLDC motor 170 is operated by the command, i.e., based on the output of the inverter 160. In addition, the functions of the mode selection unit 140, the commutation unit 150, and the digital phase-shifter 130 can be performed by microcomputer 100 as indicated above for starting signal generator 110.

The phase voltage detecting unit 120 measures voltages between the stator terminals V$a$, V$b$ and V$c$ of motor 170 which are obtained from the following equations:

V$ab$=V$a$−V$b$, V$bc$=V$b$−V$c$, and V$ca$=V$c$−V$a$

The voltage V$n$ of the central point is obtained from the phase voltages shown in the following equations by using the equation, V$n$=(V$a$+V$b$+V$c$)/3.

V$an$=V$a$−V$n$=(2V$a$−V$b$−V$c$)/3=(2V$ab$+V$bc$)/3

V$bn$=V$b$−V$n$=(2V$b$−V$c$−V$a$)/3=(2V$bc$+V$ab$)/3, and

V$cn$=V$c$−V$n$=−V$an$−V$bn$

As described in more detail below in connection with FIG. 5, the phase voltage signs S$a$, S$b$ and S$c$ are obtained by using a hysteresis comparator after decreasing the PWM frequency component from the phase voltages V$an$, V$bn$ and V$cn$ by using a low pass filter (LPF).

Figure 4:
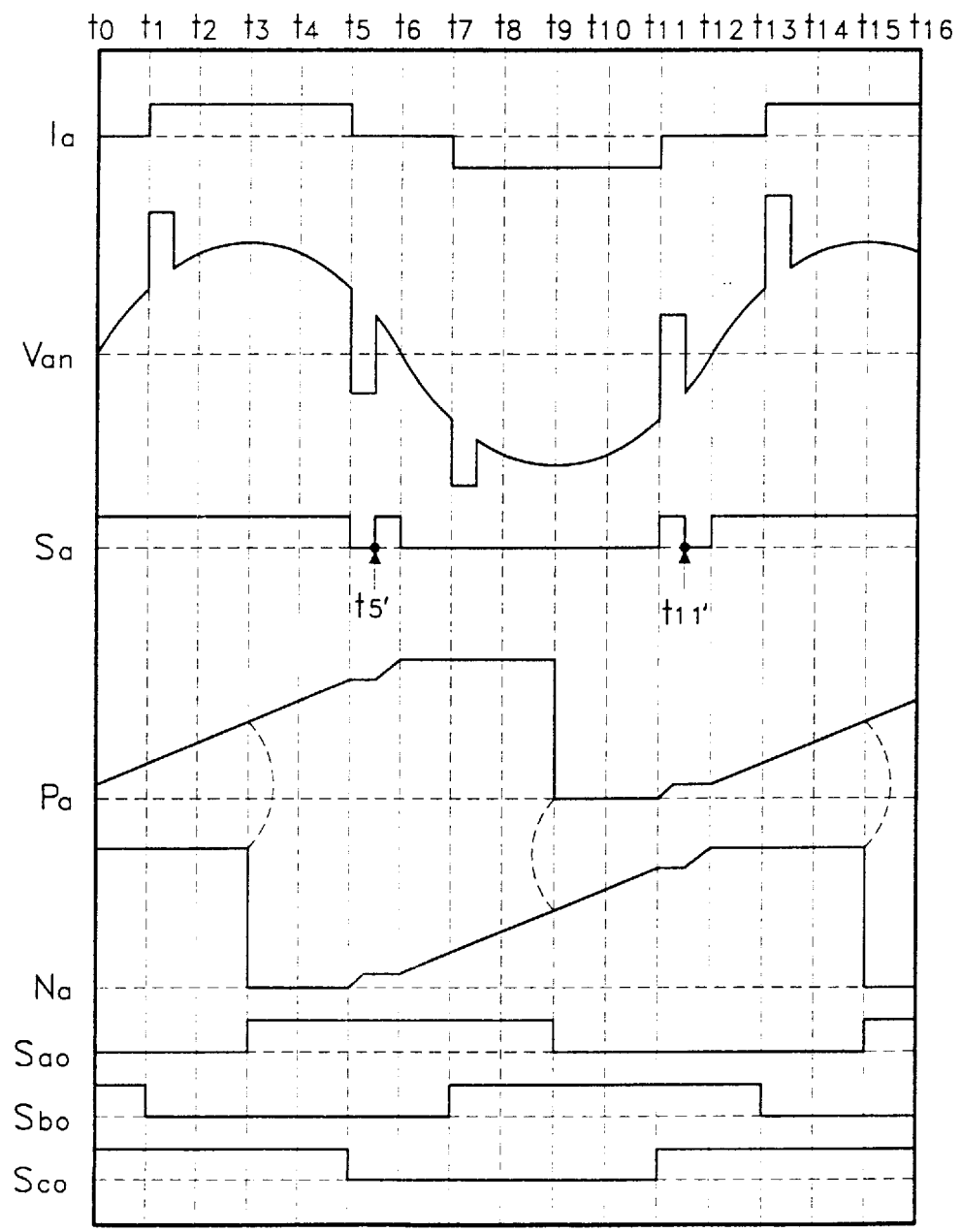
FIG. 4 is a diagram illustrating the waveforms of key units of the control circuit shown in FIG. 3.

As shown in FIG. 4, the phase voltage V$an$ has a waveform which is processed to perform the above-mentioned LPF function. The phase voltage passes through the hysteresis comparator mentioned above and a phase voltage sign indicated as S$a$, is determined. At this time, the phase voltage sign signal S$a$ has edge portions, i.e., leading and trailing edges, where the induced voltage V$an$ passes through the zero voltage level.

The digital phase-shifter 130 records the phase voltage sign which is detected by the phase voltage detecting unit 120 during each sampling period through the use of a positive counter and a negative counter described in more detail below in connection with FIG. 5. When the value of a first counter arrives at half the value of the second counter, the second counter is cleared. The two counters are cleared alternately. According to this operation, the output is reset and there is generated the output signal mentioned above which is delayed as much as 90° with respect to the basic waveform.

Figure 5:
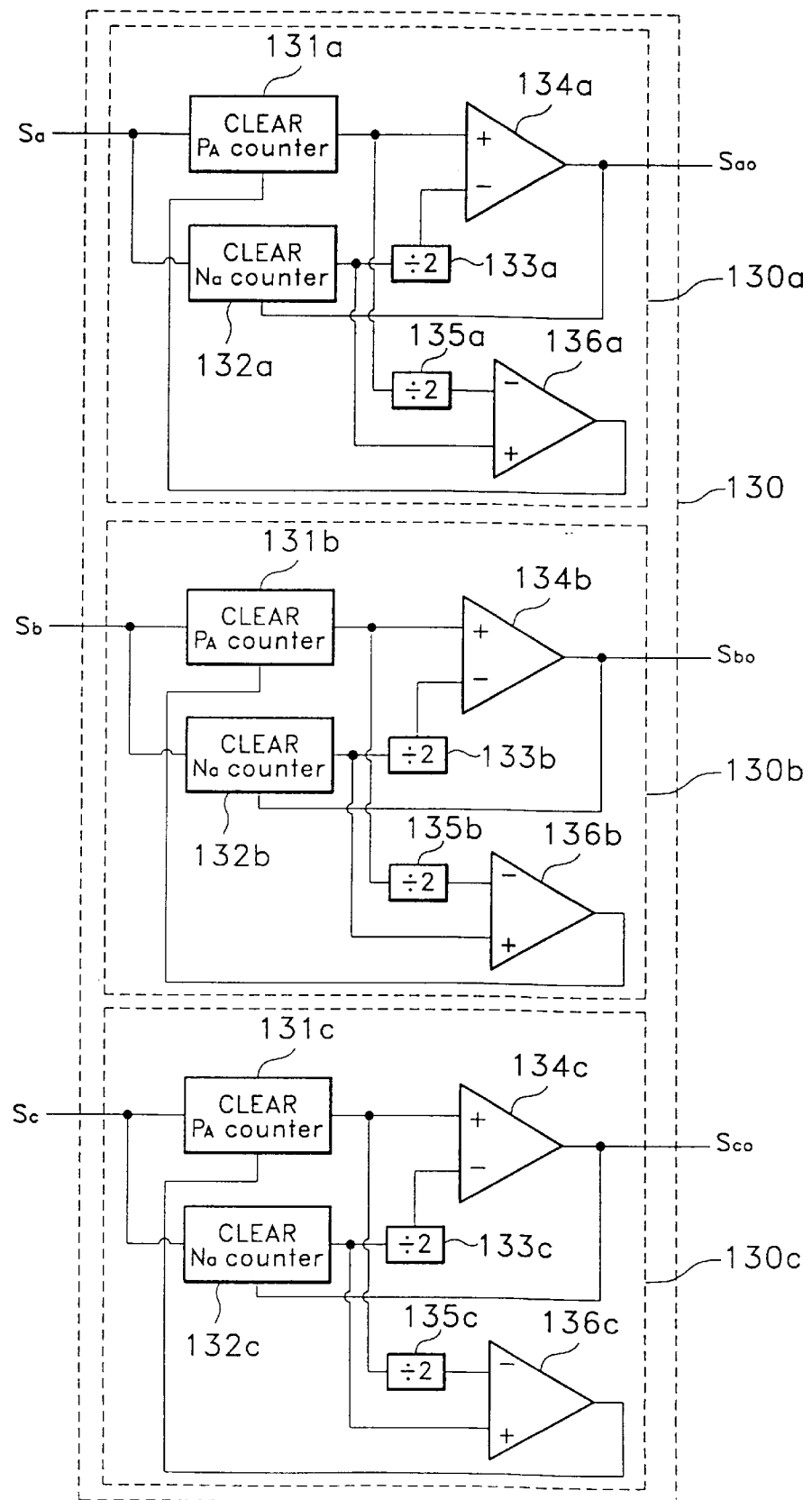
FIG. 5 is a circuit diagram of a preferred embodiment of the digital phase-shifter of FIG. 3.

FIG. 5 is a simplified circuit diagram of a preferred embodiment of the digital phase-shifter 130 of FIG. 3 showing the basic elements thereof. As shown, the digital phase-shifter 130 includes a first digital phase-shifter unit 130*a*, a second digital phase-shifter unit 130*b* and a third digital phase-shifter unit 130*c* each of which provides a signal phase-shift by receiving respective phase voltage signs S$a$, S$b$ or S$c$ from the phase voltage detecting unit 120. Because the digital phase-shifter units 130*a*, 130*b* and 130*c* use the same processing operation for providing a signal phase-shift excluding the input/output, only the first digital phase-shifter unit 130*a* would be considered in detail.

Referring to unit 130*a*, a positive counter 131*a* (hereinafter referred to as the P$a$ counter) performs a counting operation when the phase voltage signal S$a$ of phase A is at a logic "high" state. In contrast, a negative counter 132*a* (hereinafter referred to as the N$a$ counter) performs a counting operation when the phase voltage signal S$a$ of phase A is at a logic "low" state.

The value or count of the N$a$ counter 132 is divided by 2 by a first divider 133*a*. A positive sign comparator 134*a* compares the value of the P$a$ counter 131*a* with ½ the value of the N$a$ counter 131*a*. When the value or count of the P$a$ counter 132*a* is first equal to or greater than the output value of the first divider 133*a*, i.e., greater than ½ the value of counter 132*a*, the value of the N$a$ counter 132*a* is set to zero and the low state of the output of unit 130*a* is converted into the high state. This output state is maintained until the value of the P$a$ counter 131*a* drops below the output value of the first divider 133*a* or counter 131*a* is cleared by the value of the N$a$ counter 132*a*.

The value of the P$a$ counter 131*a* is divided by 2 by a second divider 135*a* and a negative sign comparator 136*a* compares the value of the N$a$ counter 132*a* with ½ the value of the P$a$ counter 131*a*. As a result of the comparison, when the value of the N$a$ counter 132*a* is first equal to or greater than the output value of the second divider 135*a*, the value of the P$a$ counter 131*a* is set to zero as shown in FIG. 4.

Figure 6:
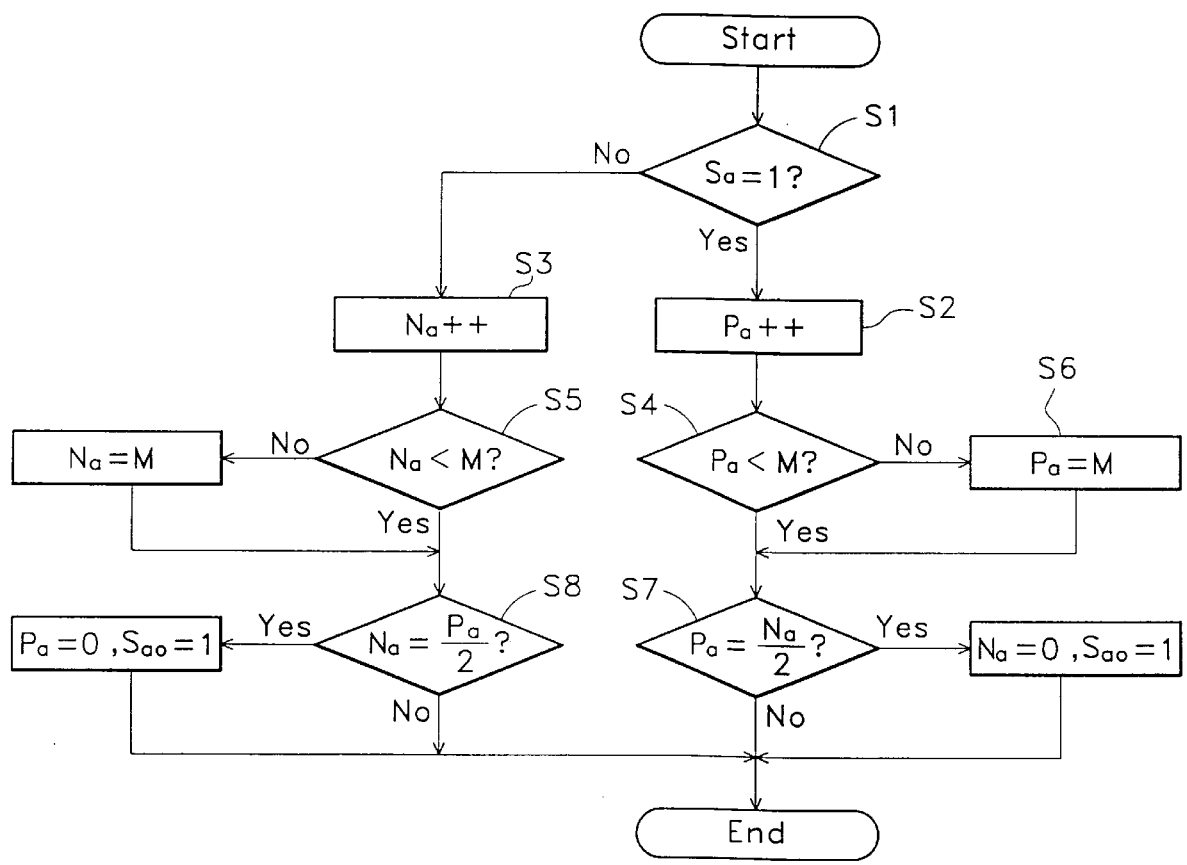
FIG. 6 is a flow chart illustrating the method of forming a signal delayed as 90° using a digital phase-shifter.

FIG. 6 is a flow chart illustrating the method or process for forming the aforementioned signal delayed as much as 90° by the digital phase-shifter 130. As shown, a determination is first made as to whether the phase voltage S$a$ of phase 'A' is 1 (S1). In the event that the phase voltage S$a$ is 1, the count of a counter P$a$ having an initial count or value of 0 is increased by 1 block (S2), while in the event that the phase voltage S$a$ is not 1, the count of a counter N$a$ having an initial count or value of 0 is increased by 1 block (S3). Next, a determination is made whether the count or values of each of the counters P$a$ and N$a$ is smaller than a predetermined value M decision diamonds (S4 and S5). The predetermined value M is a very large value and prevents overflow of the counts or values of each counter. When determining step indicated by decision diamond S4, determines that the value of the counter P$a$ is smaller than the value M, a determination is then made as to whether the value of the counter P$a$ corresponds to one-half the value of the counter N$a$ block (S7). On the other hand, when the value of the counter P$a$ is larger than the value M, the value of the counter P$a$ is set as the value M block (S6) and a determination is made as to whether the value of the counter P$a$ corresponds to one-half the value of the counter N$a$ decision diamond (S7). When, in the step represented at S7, the value of the counter P$a$ is equal to one-half the value of the counter N$a$, the counter N$a$ is initialized, i.e., reset to zero, and a phase-shifted output S$ao$ is set to 1. On the other hand, wherein the step represented at S7, the value of the counter P$a$ is not one-half the value of the counter N$a$, the procedure ends for the present time period.

As shown, in the step represented by decision diamond S5, it is determined whether the value of the counter N$a$ is smaller than the predetermined value M. When the value of the counter N$a$ is smaller than the value M, it is determined whether the value of the counter N$a$ is at least one-half the value of the counter P$a$ decision diamond (S8). When the value of the counter N$a$ is not smaller than the value M, the value of the counter N$a$ is set as the value M and a determination is made as to whether the value of the counter N$a$ (N$a$ =M) is at least one-half the value of the counter P$a$ decision diamond (S8). When, in the determining step indicated at S8, the value of the counter N$a$ is at least one-half the value of the counter P$a$, the counter P$a$ is initialized, i.e., reset to zero and the phase-shifted output S$ao$ is reset to zero. On the other hand, when, in the determining step indicated at S8, the value of the counter N$a$ is not at least one-half the value of the counter P$a$, the procedure ends for the present time period.

The operation of the control circuit of FIG. 3 and the effects of noise on the circuit are illustrated in FIG. 4. For ease of explanation, only a single phase will be described. The terminal current of the "A" terminal I$a$ is shown at the top of the figure. As illustrated, the phase voltage V$an$ is not a perfect sine wave. The rapid changes in the terminal current I$a$ cause the phase voltage V$an$ to have voltage spikes. To precisely and accurately form the commutation signal H1, these voltage spikes must be filtered out.

The phase voltage detecting unit 120 of FIG. 4 determines the polarity of the phase voltage V$an$. As shown in FIG. 4, when V$an$ is positive, the detecting unit 120 outputs a logic high signal or logical "1" which is the state of the phase voltage sign signal S$a$. On the other hand, when phase voltage V$an$ is negative, the phase voltage sign signal S$a$ is at a logic "low" state or a logical "0". The count of either counter P$a$ 131$a$ or counter N$a$ 132$a$ in unit 130$a$ of the digital phase shifter 130 is increased based on the logic level of phase voltage sign signal S$a$.

Referring again to FIG. 4, the phase voltage V$an$ is shown as being positive from t0 to t5. As a result, the phase voltage sign signal S$a$ has a logic high value. While S$a$ is in a high state, the valve in counter P$a$ 131$a$ increases in steps. FIG. 4 shows the values in counters P$a$ 131$a$ and N$a$ 132$a$ increasing continuously for illustration purposes only. The values in the counters actually increase in discrete steps. The sampling period of the counters is chosen such that several samples are taken for each time interval shown in FIG. 4. In one preferred embodiment, the sampling period is 256 $\mu$sec and the counters P$a$ 131$a$ and N$a$ 132$a$ increase in steps of 1/(256 $\mu$sec×15 V). It is important to note that counter P$a$ 131$a$ has a count or value greater than 0 in the time period immediately before t0, for reasons that will be explained below. As shown, at t3 the value in counter P$a$ 131$a$ is greater than to the value of counter N$a$ 132$a$. Since P$a$ exceeds ½ the value of N$a$, counter N$a$ is reset to 0 and phase-shifted output S$ao$ becomes "1" or high.

At t5, a voltage spike V$sn$ occurs. From t5 to t5' V$an$ is negative. A negative V$an$ results in phase voltage sign signal S$a$ assuming a logic low value and the count of counter N$a$ 132$a$ increasing. From t5' to t6, phase voltage V$an$ returns to a positive value. Therefore, phase voltage sign signal S$a$ returns to a logic high state and the count or value in counter P$a$ 131$a$ increases. Since the voltage spike occurs within a single sampling period, the value in counter P$a$ 131$a$ and the value in counter N$a$ 132$a$ both increase.

At the end of t5, the value in counter P$a$ 131$a$ exceeds ½ of the value in counter N$a$ 132$a$. However, as illustrated, counter N$a$ 132$a$ is not reset after t5 because each counter is only reset when the value or count thereof is greater than ½ the value of the other counter and a value less than the value of the other counter.

From t6 to t11, the phase voltage V$an$ is negative and the voltage sign signal S$a$ has a logic low value. As stated above, when the voltage sign signal S$a$ is at a logic low level, the count or value of counter N$a$ 132$a$ increases. The phase voltage V$an$ crosses the 0 axis at t6. Counter N$a$ 132$a$ has a value greater than 0 immediately before t6, as a result of voltage spike V$sn$. At t8, the value in counter N$a$ 132$a$ exceeds ½ the value in counter P$a$ 131$a$. Since the value in counter N$a$ 132$a$ exceeds ½ the value in counter P$a$ 131$a$, counter P$a$ is reset to 0 and the phase-shifted output S$ao$ becomes a logical 0 at t9. Accordingly, the polarity of the phase shifted output S$ao$ matches the polarity of the phase voltage V$an$ shifted by 90° and without the spikes.

The circuit of FIG. 3 continues to operate in a similar fashion to that described above. For every 360° cycle of the motor 170, there is one negative voltage spike V$sn$ in the positive portion of the phase voltage V$an$ and one positive voltage spike V$sp$ in the negative portion of the phase voltage V$an$. The voltage spikes are effectively filtered out by increasing the values in both counters P$a$ 131$a$ and N$a$ 132$a$ during the voltage spikes. The phase shifted output S$ao$ is, as a result, a function of the difference between the two counters. Using the above-described method, the waveforms of the phase-shifted outputs S$bo$ S$co$ of each phase can be obtained. Commutation signals H1, H2 and H3 are supplied by inverting the signals S$ao$, S$bo$ and S$co$.

Figure 7:
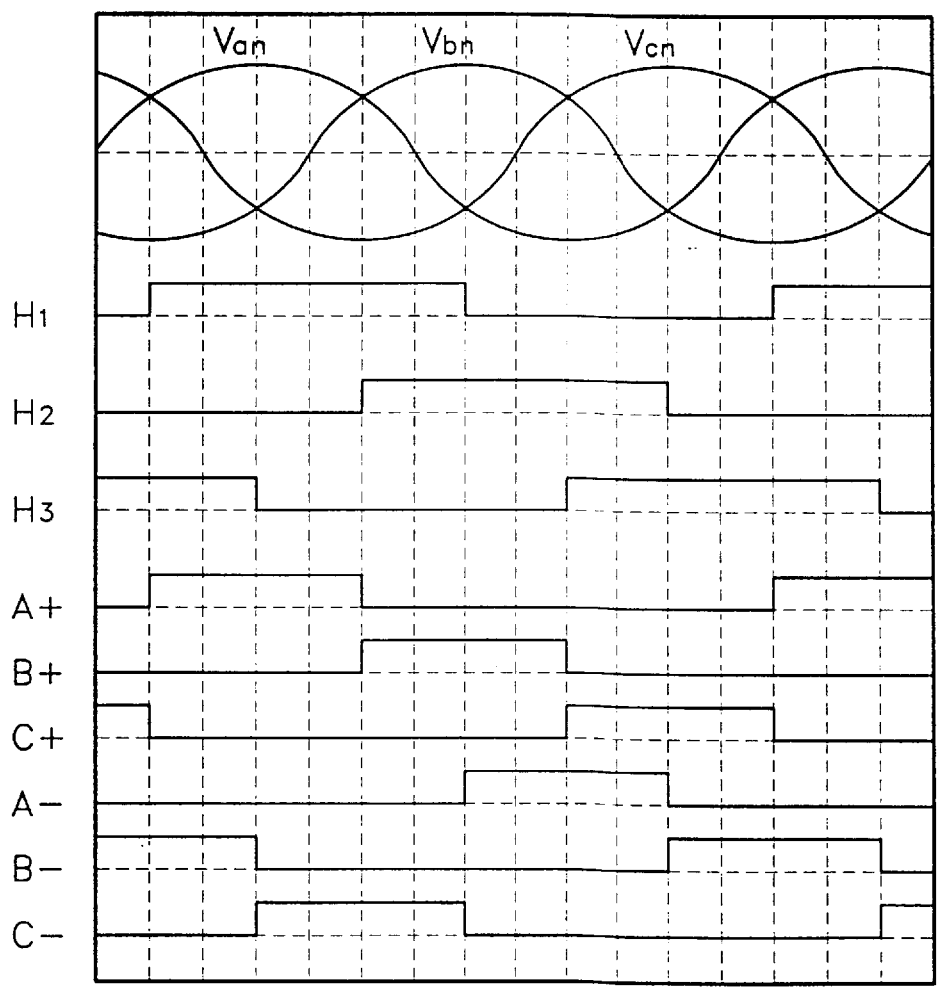
FIG. 7 is a waveform diagram illustrating signals H1, H2 and H3 and driving signals of the inverter of FIG. 3.

FIG. 7 is a waveform diagram illustrating signals H1, H2 and H3 as well as the driving signals A+, B+, C+, A–, B– and C– of the inverter 160. The commutation signals H1, H2 and H3 correspond to inverted versions of phase-shifted signals S$bo$, S$co$ and S$ao$. At this time, the commutation signals H1 and H2 have a phase difference of 120°, and similarly, H2 and H3 have a phase difference of 120°. The waveforms A+, B+, C+, A–, B– and C– shown in FIG. 7 are supplied to a switching element of the inverter 160 and turn on the power supply. The phase voltages V$an$, V$bn$ and V$cn$ are shown without the voltage spikes to more clearly show the phase differences.

As described above, the digital phase-shifter integrates the measured phase voltage signals and, in effect, filters out the influence of noise when measuring the phase voltages. Accordingly, more stable and exact commutation signals can be obtained in the presence of overload or any external noises. Moreover, in the case of a heavy load, this system makes the current transition time lead the commutation time, and compensates for the current response lagging, thereby increasing the efficiency of the system.

Although the preferred embodiments of the present invention have been disclosed for illustrative purposes, those skilled in the art will appreciate that various modifications, additions and substitutions are possible without departing from the scope and spirit of the invention as defined in the accompanying claims.

We claim:

1. A control circuit for use with a multiphase sensorless brushless direct current motor including a plurality of stator coils having terminal voltages, and for controlling magnetization of said plurality of stator coils of the motor by power supply signals supplied from a commutation unit, said control circuit comprising:

a phase voltage determining means for determining the phase voltage of each phase of the multiphase motor from the terminal voltages of said stator coils;

a phase voltage sign detecting means for detecting the sign of the phase voltage of each phase determined by phase voltage determining means and for outputting a phase voltage sign signal having a high state and a low state; and a digital phase-shifter for generating a delayed signal which is delayed up to 90° with respect to said phase voltage sign signal and for supplying said delayed signal to said commutation unit comprising:
  a first counter for counting to a higher value when said phase voltage sign signal as said high state;
  a second counter for counting to a higher value when said phase voltage sign signal has said low state;
  comparing means for determining whether the value of one of said counters is at least equal to one-half the value of the other of said counters and less than the value of the other of said counters;
  clear means for resetting said other of said counters to zero when the value of said one of said counters is at least equal to one-half the value of the other of said counters and less than the value of the other of said counters; and
  a delay signal generating means for generating a first signal when said first counter is reset to zero by said clear means, and for generating a second signal of a different state from said first signal when said second counter is reset to zero by said clear means.

2. The control circuit of claim 1, wherein said digital phase-shifter further includes:
  a set value comparison means for comparing the value of each of said counters with a predetermined maximum value; and
  a set value maintaining means for maintaining the value of a compared counter at said maximum value when the value of the compared counter is not less than said maximum value.

3. A control apparatus for a multiphase sensorless brushless direct current motor including a plurality of stator coils having terminal voltages, said control apparatus comprising:
  a stepping signal generating means for generating stepping signals for starting said motor;
  a phase voltage detecting means for detecting the voltages of each phase of said motor from the terminal voltages of the stator coils of said motor;
  a phase voltage sign detecting means for detecting the polarity of each of said phase voltages detected by said phase voltage detecting means and for outputting corresponding phase voltage sign signals;
  a digital phase-shifter for outputting phase shifted signals delayed up to 90° with respect to said phase voltage sign signals;
  a mode selection means for comparing said stepping signals with said phase shifted signals and for outputting said stepping signals until said motor reaches a predetermined speed and outputting said phase shifted signals after said motor reaches said predetermined speed;
  a commutation means for outputting the signal outputted by said mode selection means as a power supply signal for said stator coils; and
  an inverter for supplying the electrical power to said stator coils of said motor according to said power supply signal outputted by said commutation means.

4. The apparatus of claim 3, wherein said digital phase-shifter comprises three phase shifter units, each of said phase shifter units comprising:
  a first counter for counting to a higher value when said phase voltage sign signal is in a first state;
  a second counter for counting when said phase voltage sign signal is in a second state;
  a comparator for determining if the value of one of said counters is at least equal to one-half of the value of the other of said counters and less than the value of the other of said counters; and delay signal generating means for generating a delay signal which changes when the value of one of said counters is at least equal to one-half of the value of the other of said counters and less than the value of the other of said counters.

5. A control method controlling the magnetization of a plurality of stator coils of a multiphase brushless DC motor by a power supply signal supplied to the stator coils from a commutation unit, said method comprising the steps of:
  determining the phase voltage for the phase of said multiphase motor from the terminal voltages of each of the stator coils;
  detecting the polarity of said phase voltages and outputting corresponding phase voltage sign signals;
  digital phase-shifting said phase voltage sign signals so as to generate delayed signals delayed up to 90° with respect to the phase voltage sign signals, and outputting said delayed signals to said commutation unit comprising, for each detected phase voltage of the detected phase voltages the steps of:
    counting to a higher value with a first counter when the polarity of the detected phase voltage is positive;
    counting to a higher value with a second counter when the polarity of the detected phase voltage is negative;
    comparing the values in said first and second counters for determining whether the value of one of said counters is at least one-half of the value of the other of said counters and less than the value of the other of said counters;
    resetting said other of said counters to zero when said one of said counters is at least equal to one-half of the value of the other of said counters and less than the value of the other of said counters;
    generating a first logic signal when said first counter is reset and generating a different logic signal when said second counter is reset.

6. The method of claim 5, wherein the step of digital phase-shifting further includes the steps of:
  comparing the value of each of said counters with a predetermined maximum value; and
  maintaining the value of a compared counter at said maximum value when the value of the compared counter is not less than said maximum value.

* * * * *